March 14, 1967  F. R. ETCHBERGER  3,309,041
JET LIFT ARRANGEMENT FOR VTOL AIRCRAFT
Filed April 5, 1965  3 Sheets-Sheet 2

INVENTOR.
FRANK R. ETCHBERGER
BY
*George C. Sullivan*
Agent

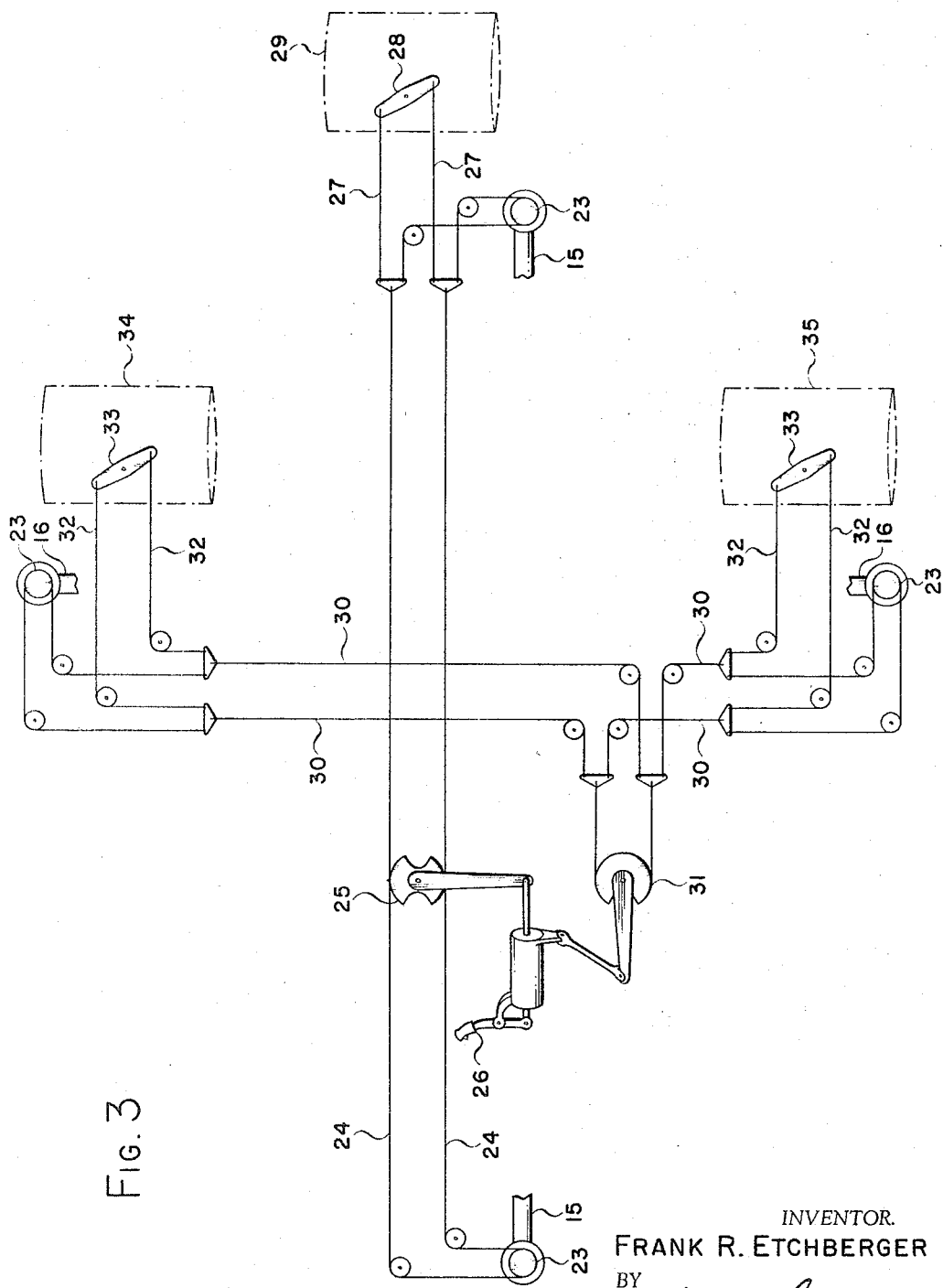

United States Patent Office 3,309,041
Patented Mar. 14, 1967

3,309,041
JET LIFT ARRANGEMENT FOR VTOL AIRCRAFT
Frank R. Etchberger, Atlanta, Ga., assignor to Lockheed
Aircraft Corporation, Los Angeles, Calif.
Filed Apr. 5, 1965, Ser. No. 445,595
18 Claims. (Cl. 244—23)

This invention relates to vertical rising and landing, fixed wing aircraft (commonly called VTOL aircraft) and more particularly to a jet lift arrangement and assembly for such an aircraft whereby the distribution of the lift forces produced thereby results in greater stability and control of the aircraft during the vertical or hover regime.

During the hover regime VTOL aircraft is especially sensitive to variations in the effective direction of thrust from its lift engines. Such engines are therefore necessarily related in position to the center of gravity of the aircraft whereby the resultant lift forces produced thereby pass vertically through the center of gravity. In the event of malfunction of one or more of these engines, the resultant line of thrust deviates from the design direction producing an asymmetric effect on the aircraft. During the critical hover mode of the aircraft this occurrence even momentarily can prove fatal.

Heretofore, control and stability of the aircraft under such adverse conditions have been largely left to chance through the manipulation of the aircraft control surfaces with or without supplemental trim devices. When more positive means have been proposed, these have consisted of counterbalancing forces usually employing air pressure tapped off of or bled from the compressor of one of the lift engines and piped to preselected locations of the aircraft relative to the center of gravity. The objection to such counterbalancing means is that they unduly take from the engine power otherwise available for lift at a time when this power is most needed. Also the lag, i.e., the time between the onset of the asymmetric condition and the response of corrective forces, is usually too long.

The present invention is therefore primarily directed to the foregoing problems associated with VTOL aircraft during the hover mode. To this end it is proposed to arrange the jet lift producing device on the aircraft with its exhaust outlet directed in a vertically downward direction and producing resultant lift forces that pass vertically through the center of gravity of the aircraft. Where this lift producing device comprises multiple jet engines, the exhaust outlet or nozzle of each is disposed in a vertical plane in close proximity to the center of gravity of the aircraft.

In any case a predetermined portion of the exhaust gases from the lift producing device, thus disposed, is extracted from the tail pipe thereof and directed to a plenum chamber while the balance is discharged in the conventional manner through its exhaust outlet or nozzle. The plenum chamber is provided with a plurality of outlets symmetrically disposed about the aircraft center of gravity both laterally and longitudinally, each terminating in an exhaust nozzle directed in a downward direction. Each exhaust nozzle from the plenum chamber includes means to vary the cross sectional area thereof from fully open to fully closed positions.

In view of the foregoing construction and arrangement, a preselected percentage of the exhaust gases produced by the jet lift producing device is transferred from the exhaust nozzle adjacent the center of gravity of the aircraft to the remote plenum chamber nozzles. This results in virtually no reduction in the total lift forces produced on the aircraft and at the same time locates thrust where it can be employed by regulation or adjustment of the remote plenum chamber nozzles to produce instantaneous balancing forces on the aircraft in an emergency.

Moreover, the location of a portion of the lift forces as herein proposed offers the additional advantage of hover control of the aircraft in pitch, yaw and roll by an adjustment of the plenum chamber nozzles. This is readily accomplished by and through interconnecting linkage, including a pilot's control therefor, between valve means associated with each of the plenum chamber nozzles disposed in the same plane to vary the effective discharge openings thereof as well as means to angularly adjust the position and hence the direction of thrust of one or more of these nozzles. Preferably such linkage and the control for such adjustment means is incorporated into the existing system for the attitude control surfaces of the aircraft so that the usual and customary operation by the pilot automatically effects maneuvers in the hover regime.

With the above and other objects in view as will be apparent, this invention consists in the construction, combination and arrangement of parts all as hereinafter more fully described, claimed and illustrated in the accompanying drawings wherein:

Figure 1:
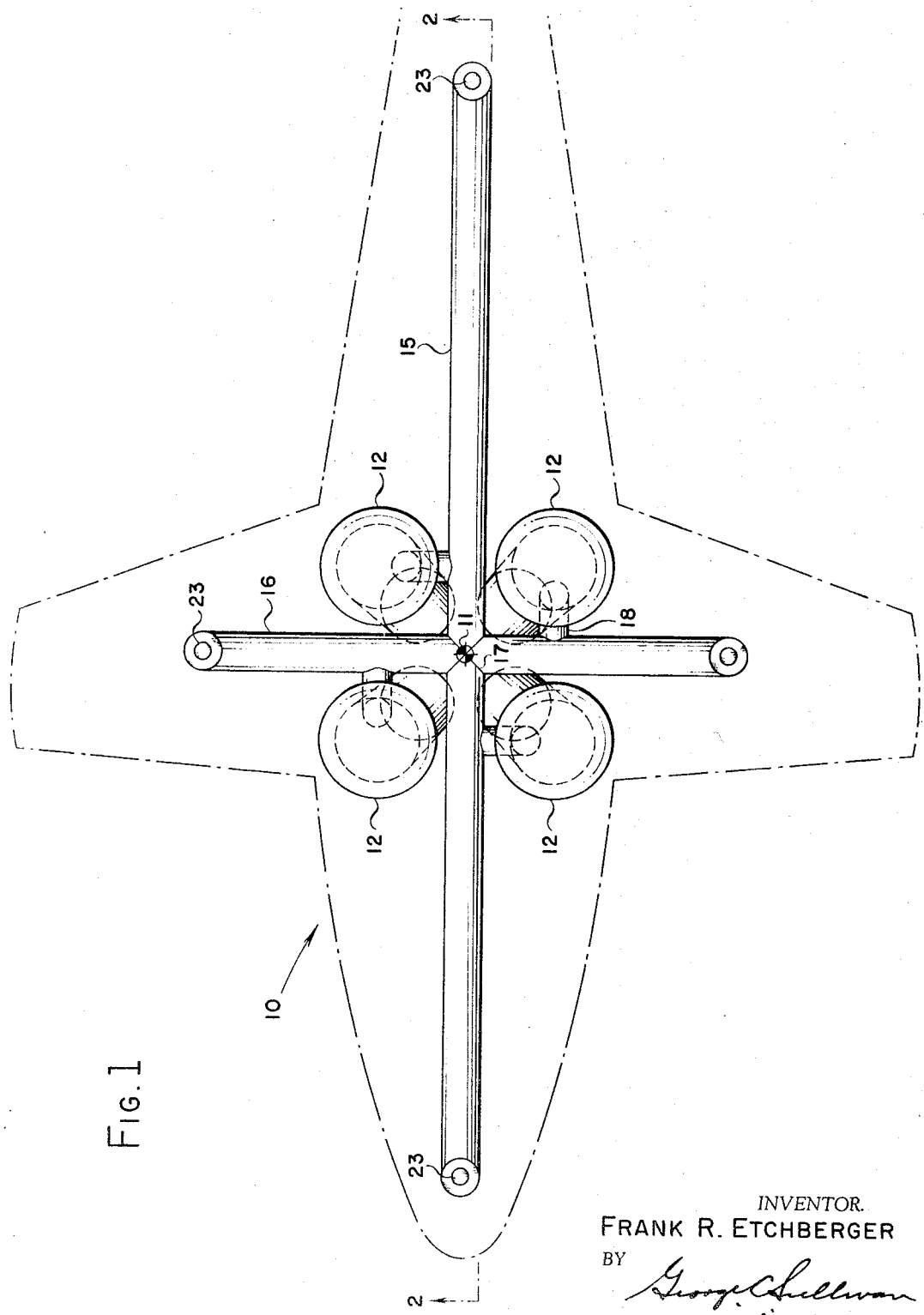
FIGURE 1 is a plan view of an aircraft in phantom outline showing the arrangement and assembly of a jet lift producing device incorporated therein in accordance with the teachings hereof, such device including a cluster of turbojet engines.
Figure 2:
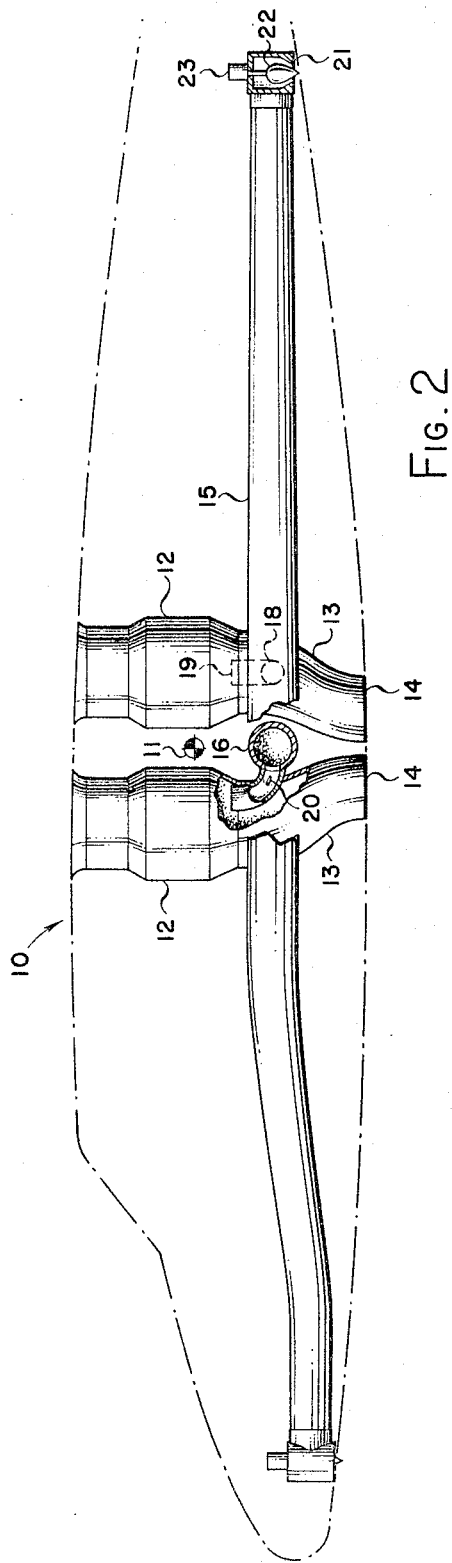
FIGURE 2 is a longitudinal section taken along the lines 2—2 of FIGURE 1, a portion of the tail pipe of one of the engines being broken away to show the connection thereto of a plenum chamber common to all such engines.
Figure 4:
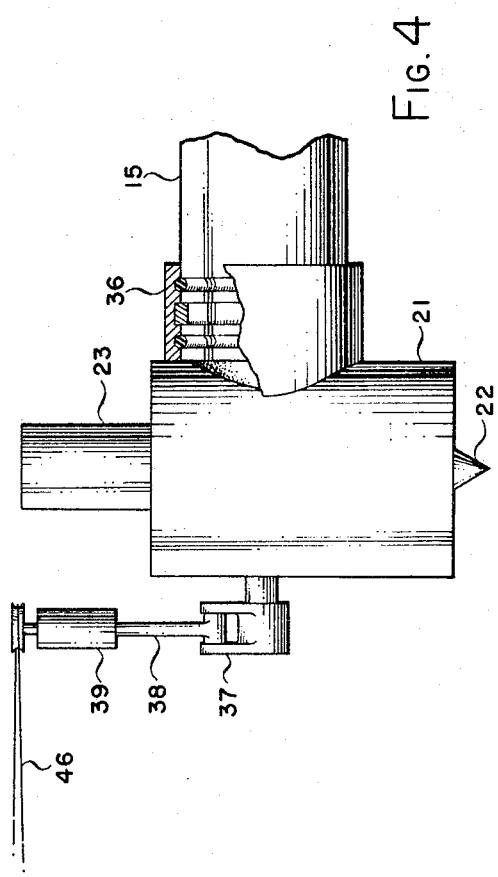

FIGURE 3 is a schematic diagram in plan form of the arrangement herein proposed to show the interconnecting linkage between the plenum chamber nozzles and the interconnection of such linkage with the linkage of the aircraft's control system for the operation thereof in unison whereby conventional movement of the pilot's control lever effects pitch and roll of the aircraft during the hover as well as the cruise regimes; and FIGURE 4 is a detail of means to vary the direction of thrust of one or more of the plenum chamber nozzles to effect yaw of the aircraft during the hover regime.

Referring more particularly to the drawings, 10 designates a conventional VTOL aircraft having a center of gravity 11 in the stable hover mode. A cluster of turbojet lift engines 12 is mounted vertically in the aircraft 10 in close proximity to the center of gravity 11 each terminating in a tail pipe 13 that is formed or shaped to dispose its outlet 14 vertically adjacent the center of gravity 11. Thus disposed, the several outlets or nozzles 14 are symmetrically arranged about the center of gravity 11 with their adjacent portions substantially tangentially disposed one to another.

Internally the aircraft 10 is provided with longitudinal and lateral ducts 15 and 16 respectively that intersect and are interconnected one with the other, as at 17. The tail pipe 13 of each engine 12 is connected to the interior of one of the ducts 15 or 16 through a bleed duct 18. Preferably these bleed ducts 18 are symmetrically located with reference to the center of gravity 11 and equally divided between the ducts 15 and 16, the duct 18 associated with each engine 12 being disposed at right angles to the duct 18 associated with the next adjacent engine 12.

Each bleed duct 18 pierces the side wall of its associated engine 12 and terminates in an end orifice 19 facing the exhaust stream passing through the tail pipe 13. At its other end each bleed duct 18 is mounted in the side wall of one of the ducts 15 or 16 for communication with the interior thereof. A one-way control valve 20 is operatively mounted in each duct 18 to permit fluid flow from the associated engine 12 and prevent return flow thereto. The transverse dimension of each of the bleed ducts 18 is such that a predetermined percentage (on the order of 10%) of the total exhaust gases passing through the associated tail pipe 13 is delivered to the interior of the ducts 15 and 16. The ducts 15 and 16 thereby constitute a plenum chamber having generally an "X" configuration.

At their outer ends each of the ducts 15 and 16 terminates in a downwardly directed outlet opening or nozzle 21 all of which have substantially identical dimensions. The length of the ducts 15 and 16 is such that their respective nozzles 21 are symmetrically disposed about the center of gravity 11 on the roll and pitch axes of the aircraft 10. The exhaust gases passing therethrough act in concert with the exhaust nozzles 14 of the several engines 12 to supplement the lift thereof. For all intents and purposes therefore the total lift forces thereby produced on the aircraft 10 are the same as they would be if all of the engine exhaust were discharged through the tail pipe nozzles 14.

At the same time the ducts 15 and 16 are constantly filled with exhaust gases so long as the engines 12 are operating and by adjustment of the cross sectional area of the several nozzles 21, the thrust produced by the gases passing therethrough may be modulated. To this end each of the nozzles 21 is provided with control means in the form of a needle valve 22 mounted for reciprocation therein by an actuator 23. Preferably, the several actuators 23 are operated by means of and through common control linkage between the cockpit of the aircraft 10 and the external control surfaces.

Referring specifically to FIGURE 3, the actuators 23 of the nozzles 21 associated with the duct 15 are interconnected for operation in unison in opposite directions through links 24. These links 24 in turn are connected medially of their length to the opposite corresponding ends of a bellcrank 25 actuated by fore and aft movement of the pilot's control lever 26, and to connectors 27 from opposite corresponding ends of the elevator horn 28. Thus, forward movement of the lever or stick 26 simultaneously reduces the nozzle opening at the forward end and increases the nozzle opening at the aft end of the aircraft 10 while lowering the elevator 29. A pitching moment in a nose downward direction is thereby effected whether the aircraft is in the hover or cruise mode. By the same token, movement of the stick 26 in the aft direction produces an opposite pitching moment of the aircraft, viz, nose upward.

The actuators 23 of the nozzles 21 associated with the duct 16 are similarly interconnected for operation in unison in opposite directions through links 30. The links 30 are in turn connected medially of their length to the opposite corresponding ends of a bellcrank 31 actuated by lateral movement of the stick 26 and to connectors 32 from opposite corresponding ends of each aileron horn 33. Movement of the stick 26 to the left (toward the reader in FIGURE 3) simultaneously reduces the nozzle opening on the left side and increases the nozzle opening on the right side of the aircraft 10 while raising the left aileron 34 and lowering the right aileron 35. A rolling moment in a counter-clockwise direction is thereby effected whether the aircraft is in the hover or cruise mode. Conversely, movement of the stick 26 to the right (away from the reader in FIGURE 3) produces an opposite rolling moment of the aircraft, viz, a clockwise direction about its roll axis.

Yaw control of the aircraft 10 is accomplished by angular adjustment of one or more of the nozzles 21 through operating linkage interconnecting each such nozzle 21 with the existing rudder control system of the aircraft in a manner similar to that just described. For example, referring specifically to FIGURE 4 the aft nozzle 21 disposed on the roll axis of the aircraft 10 is rotatably mounted on the end of duct 15 through a swivel joint 36 of conventional design. Concentrically projecting from the nozzle 21 with reference to the joint 36 is a crank 37 the the outer end of which is adapted to receive the arm 38 of an actuator 39. The actuator 39 is connected to the rudder control linkage (not shown) of the aircraft 10 for operation thereby corresponding to left and right deflections of the vertical control surface or rudder through connectors 46. These connectors 46 are similar in all respects to the connectors 27 and 32 previously described in the operation of the elevator 29 and ailerons 34 and 35 respectively.

In view of the foregoing arrangement and construction, it should be apparent that with the left engines 12 operating the effective resultant lift forces are applied on the aircraft 10 through the center of gravity 11. At the same time a fractional part of these lift forces is located on the roll and pitch axes remote from the center of gravity 11 of the aircraft 10 through the several symmetrically disposed nozzles 21. The pilot through his control stick 26 and rudder controls operated in the conventional manner can both modulate the thrust through the several nozzles 21 and adjust its direction to thereby obtain stability of the aircraft during the hover mode. At the same time should one or more of the engines 12 malfunction or its operation otherwise become erratic, the thrust constantly available through the several nozzles 21 may be instantaneously applied to compensate the asymmetric condition of the aircraft.

When the lift engines 12 are not operating, i.e., during the cruise regime of the aircraft 10, the adjustment of the several nozzle openings and their verticle direction as above described is ineffective. The operation of the several aircraft control surfaces in conventional manner is effective in controlling the flight attitude and stability of the aircraft 10.

While a particular embodiment of the invention has been hereinabove illustrated and described, it is to be understood that various changes and modifications thereof will appear obvious to those skilled in the art. The appended claims are intended to cover all such changes and modifications that fairly fall within the true spirit and scope of this invention.

What is claimed is:

1. In a VTOL aircraft, the combination of a jet lift producing device mounted on said aircraft with its exhaust outlet disposed concentric with the center of gravity of the aircraft, a plenum chamber, a fluid passage connecting said device adjacent its exhaust outlet aforesaid to said plenum chamber whereby a predetermined percentage of the exhaust gases from said device is delivered to said chamber, and exhaust nozzles extending from said plenum chamber in a vertically downward direction and symmetrically disposed with respect to the aircraft center of gravity.

2. The combination of claim 1 wherein said exhaust nozzles are located on the pitch and roll axes of said aircraft.

3. The combination of claim 2 including variable area means associated with each of said nozzles, and angularly adjustable means associated with at least one of said nozzles to vary the direction of its exhaust.

4. The combination of claim 2 including variable area means associated with each of said nozzles, and a one way valve in said fluid passage to prevent the return flow of said exhaust gases to said exhaust outlet.

5. The combination of claim 1 wherein said jet lift producing device comprises an assembly of turbojet engines terminating in exhaust nozzles symmetrically disposed about the center of gravity of the aircraft with their adjacent portions substantially tangential.

6. The combination of claim 1 wherein said plenum chamber comprises a pair of intersecting ducts one disposed along the roll and the other along the pitch axes of said aircraft.

7. The combination of claim 5 wherein said fluid passage comprises a duct interconnecting each said engine with said plenum chamber, each such duct being disposed at right angles to the next adjacent duct.

8. The combination of claim 6 wherein said fluid passage comprises symmetrically disposed ducts interconnecting said jet lift producing device with said pair of intersecting ducts.

9. The combination of claim 5 wherein said plenum chamber comprises a pair of intersecting ducts one disposed on the roll and the other on the pitch axes of said aircraft and said fluid passage comprises a duct interconnecting each said engine with one of said intersecting ducts, no adjacent interconnecting duct being connected to the same intersecting duct.

10. The combination of claim 4 wherein said variable area means comprises a needle valve mounted within each said nozzle, and an actuator to adjust the position of each said valve.

11. The combination of claim 1 wherein said predetermined percentage is on the order of ten percent.

12. The combination of claim 10 including interconnecting linkage between the actuators associated with said nozzles on said pitch and roll axes respectively for the concurrent equal and opposite operation thereof.

13. In a VTOL aircraft having external control surfaces and an operating system for adjusting the positions thereof, the combination of a jet lift producing device mounted on said aircraft with its exhaust outlet disposed in vertical alignment with the center of gravity of the aircraft, a plenum chamber, fluid passage means in communication with said plenum chamber and said exhaust outlet for delivery of a predetermined precentage of exhaust gases from said drive to said chamber, a plurality of adjustable exhaust nozzles extending from said plenum chamber and symmetrically disposed with respect to the aircraft center of gravity, and connections between said nozzles and the operating system aforesaid for the adjustment of said nozzles in unison with said control surfaces.

14. The combination of claim 13 wherein said adjustable exhaust nozzles are disposed on the roll and pitch axes of the aircraft remote from the center of gravity.

15. The combination of claim 14 including interconnecting linkage between said exhaust nozzles on said roll and pitch axes respectively for the equal and opposite operation thereof.

16. The combination of claim 14 wherein said external control surfaces include ailerons, elevators and rudders and said connections are between the nozzles on said roll and pitch axes and the elevators and ailerons respectively with at least one of said nozzles being connected to said rudder.

17. The combination of claim 16 wherein the adjustment of said exhaust nozzles connected to the elevators and ailerons as aforesaid varies the effective cross sectional opening thereof and the adjustment of each nozzle connected to the rudder as aforesaid varies the angular position thereof vertically.

18. The combination of claim 16 wherein said one nozzle is the aftmost nozzle on the roll axis.

References Cited by the Examiner

UNITED STATES PATENTS

| | | | |
|---|---|---|---|
| 2,870,978 | 1/1959 | Griffith et al. | 244—23 |
| 2,959,374 | 11/1960 | Laskowitz | 244—52 X |
| 3,182,446 | 5/1965 | Kaminski | 244—23 X |

OTHER REFERENCES

Space/Aeronautics, pp. 58–61, September 1960.

MILTON BUCHLER, *Primary Examiner.*

LARRY C. HALL, ALFRED E. CORRIGAN,

*Examiners.*